(Model.)

S. STRONG.
LOCKING CLOTHES PIN.

No. 273,633. Patented Mar. 6, 1883.

Witnesses,
James M. Vickroy
Thomas Thomas

Inventor,
Sutton Strong

UNITED STATES PATENT OFFICE.

SUTTON STRONG, OF HARMONY, INDIANA, ASSIGNOR OF ONE-HALF TO JAMES M. VICKROY, OF SAME PLACE.

LOCKING CLOTHES-PIN.

SPECIFICATION forming part of Letters Patent No. 273,633, dated March 6, 1883.

Application filed July 29, 1882. (Model.)

*To all whom it may concern:*

Be it known that I, SUTTON STRONG, a citizen of the United States, residing at Harmony, in the county of Clay and State of Indiana, have invented certain new and useful Improvements in Locking Clothes-Pins, (as in Letters Patent granted me, No. 257,987, and bearing date May 16, 1882;) and I do hereby declare that the following is a full, clear, and exact description of the same, reference being had to the annexed drawings, making a part of this specification, and to the letters and figures of reference marked thereon.

Figure 1:
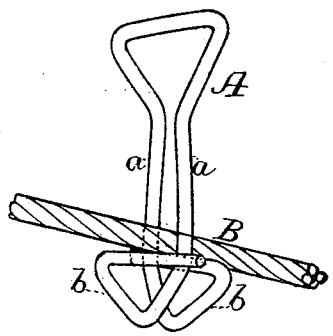
Figure 2:
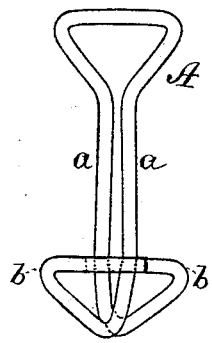

Figure 1 of the drawings is a representation of a perspective view of my improvement. Fig. 2 is a side elevation, and Fig. 3 is an edge view, of the same.

This invention relates to improvements in wire clothes-pins, and has for its object to provide such a pin as will hold the clothes firmly to the line, and from its peculiar construction cannot become unlocked or disengaged from their weight or the action of the wind, and readily adjusted to or detached from said line. These objects I attain by the construction substantially as shown in the drawings and hereinafter described.

In the accompanying drawings, A represents a clothes-pin made of spring-wire bent to form a triangular loop at its upper end, and has depending arms $a\,a$, (which are covered by Letters Patent No. 257,987, bearing date May 16, 1882.) The arms $a\,a$ are bent upwardly and then inward and past arms $a\,a$, thereby forming triangular lugs $b\,b$, which in turn are bent out sidewise from each other sufficiently to admit the clothes-line B, as shown at Fig. 3. By having the triangular lugs $b\,b$ formed in the manner described a broad bearing-surface is given both arms $a\,a$, and at the same time admit of no sharp corners or ends which would do injury to the clothes while on the line.

Figure 3:
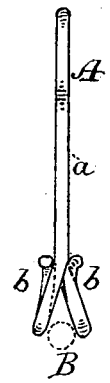

When the pin is intended to be used it is placed upon the line so that the line rests between the triangular lugs, as shown at Fig. 3, and is then pushed down until the triangular lugs $b\,b$ have passed the line, when the lugs $b\,b$ will automatically make a half-turn under the line, from opposite sides, as shown in Fig. 1, thereby locking the line between arms $a\,a$ by a double lock, as indicated in Fig. 1, the clothes-line being represented as B. To remove the pin, it is grasped by the top and turned until the triangular lugs $b\,b$ become parallel with the line, at which time a slight pull upward will cause it to slip free from said line.

It will be seen by the foregoing description that I have constructed an improved clothes-pin, which is neat in its appearance, readily attached to and detached from the clothes-line, and cannot slip or become loose from the said line by the weight of the clothes or action of the wind.

Having now fully described my improvement, what I claim as new, and desire to secure by Letters Patent, is—

The depending arms $a\,a$, bent, substantially as shown, to form a triangular lug, $b$, on each arm $a$, substantially as described.

In testimony that I claim the above improvements I have hereunto subscribed my name in the presence of two witnesses.

SUTTON STRONG.

Witnesses:
 JAMES M. VICKROY,
 THOMAS THOMAS.